June 29, 1937.  E. H. TAYLOR  2,085,615
CASING FEEDING MECHANISM
Filed Feb. 14, 1936  3 Sheets-Sheet 1
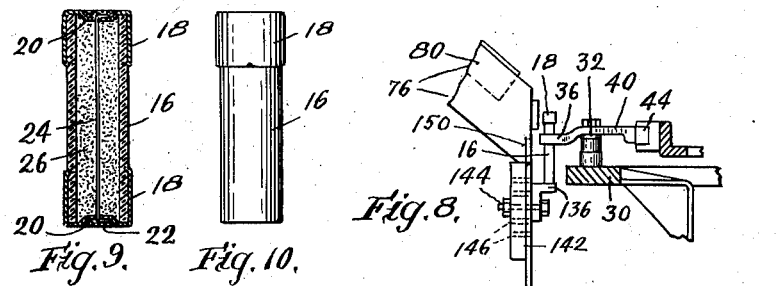
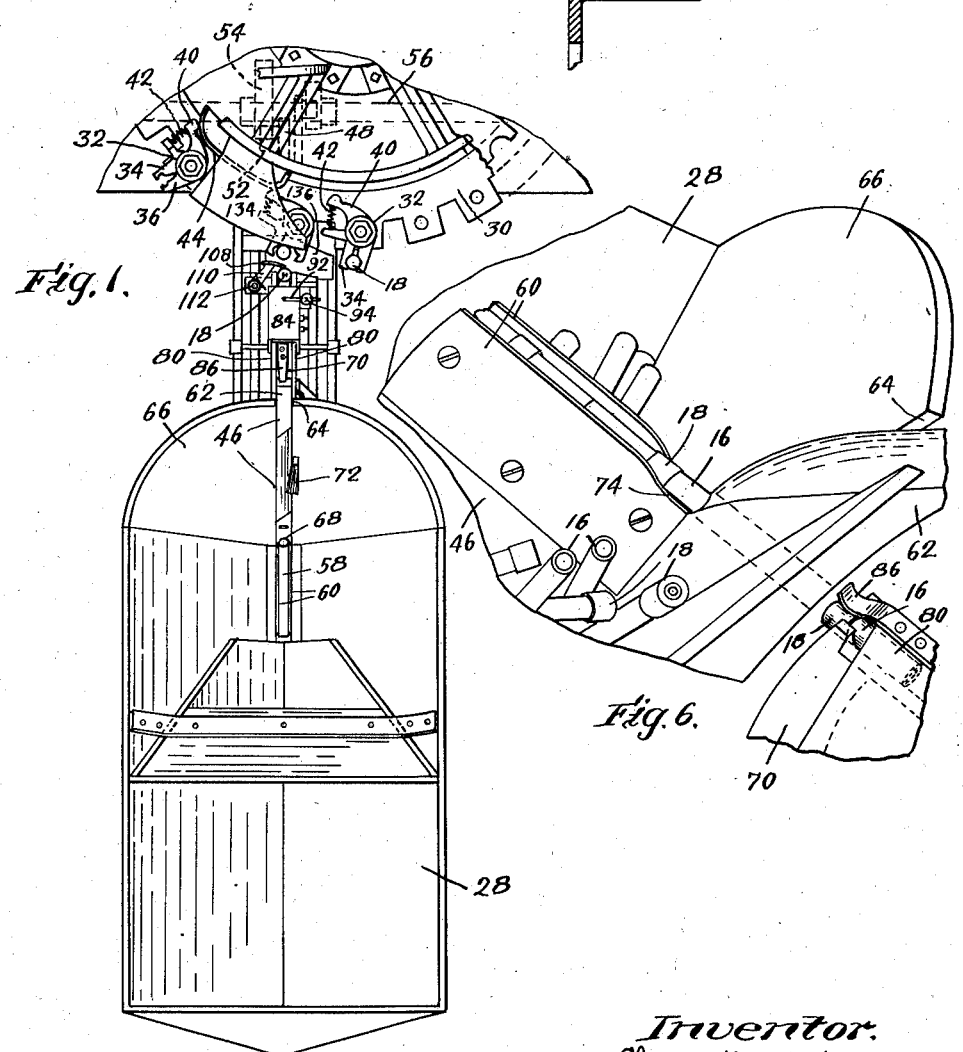
Inventor
Elmer H. Taylor
by F. T. Greenwood
atty June 29, 1937.  E. H. TAYLOR  2,085,615
CASING FEEDING MECHANISM
Filed Feb. 14, 1936   3 Sheets-Sheet 2
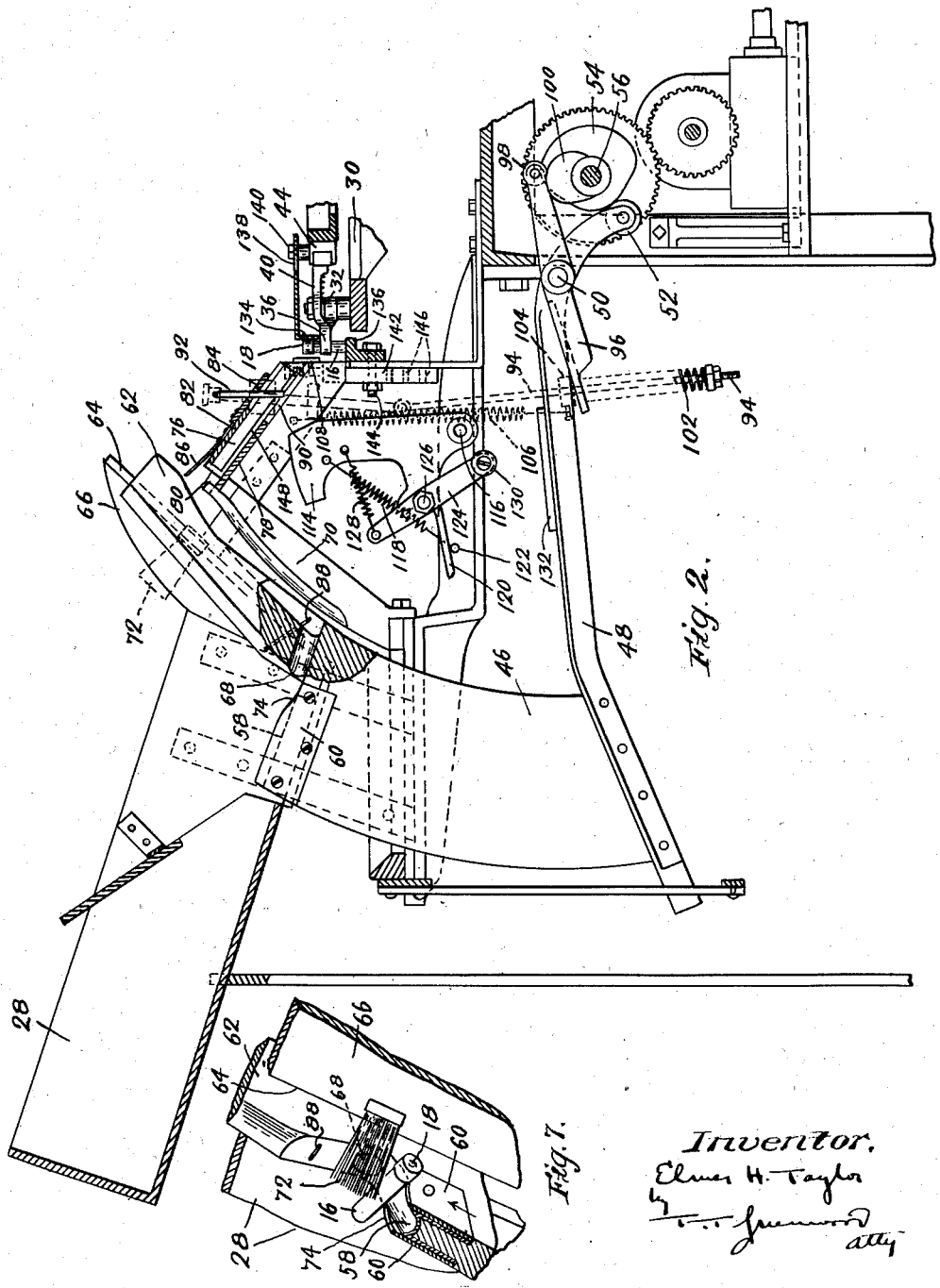
Inventor.
Elmer H. Taylor

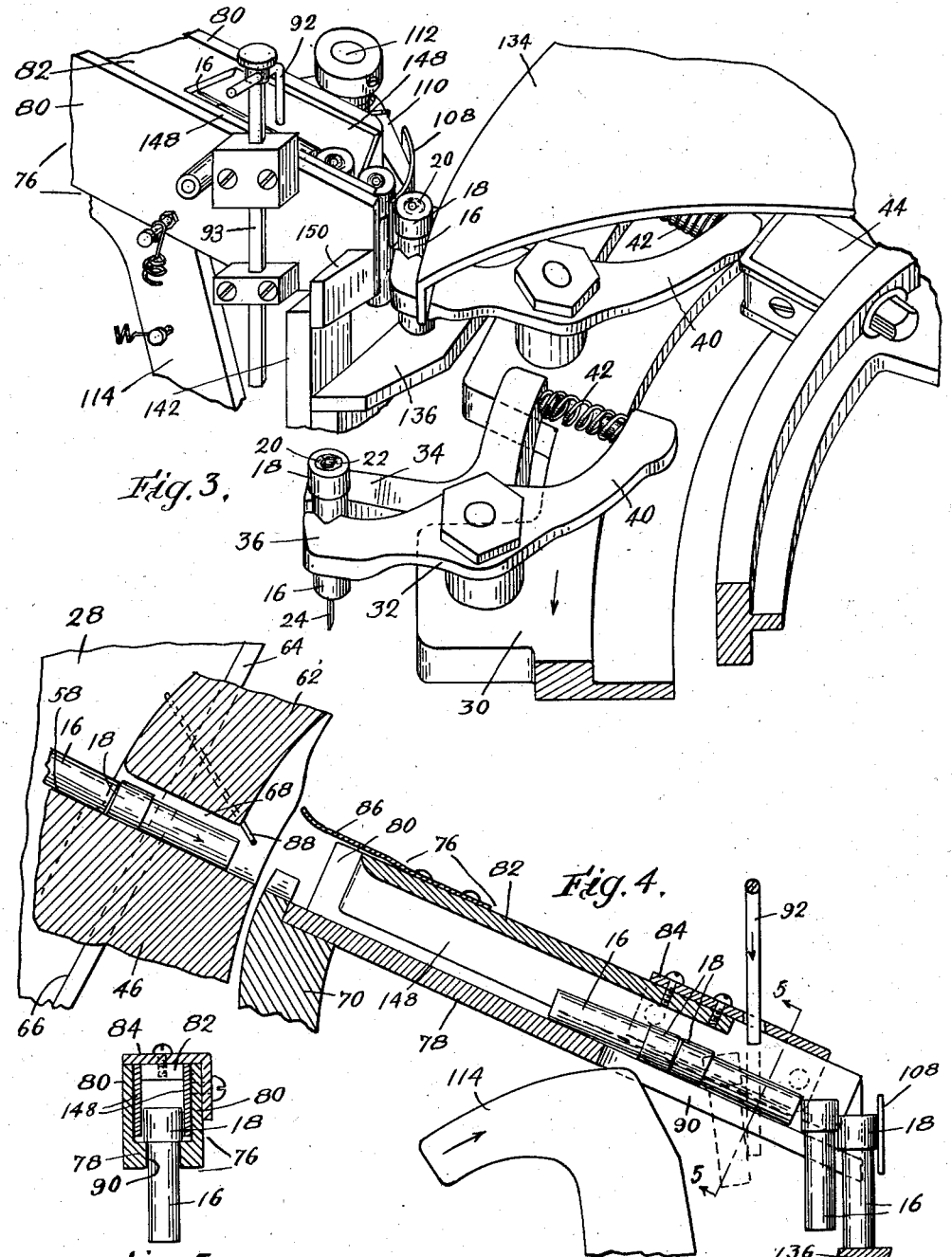

Patented June 29, 1937

2,085,615

UNITED STATES PATENT OFFICE 2,085,615

CASING FEEDING MECHANISM

Elmer H. Taylor, Newburyport, Mass., assignor to The Chase-Shawmut Company, Newburyport, Mass., a corporation of Massachusetts Application February 14, 1936, Serial No. 63,904

29 Claims. (Cl. 29—60)

This invention relates to the manufacture of cartridge type electric fuses and particularly to automatically operative mechanism for removing successive single fuse casings from a collection thereof and for advancing the successive casings all in the same order for fuse assembly operations on the casing.

The cartridge type electric fuse with which this invention particularly is concerned comprises a tubular enclosing casing of insulating material having metal end caps thereon that constitute the terminals of the fuse, a fuse link extended through the tubular casing and electrically connected with the end caps, and an insulating arc quenching filler within the casing and around the fuse link.

It is an object of the present invention to effect the delivery of the tubular casings, each of which may have one end cap thereon, from a hopper containing a collection of such casings arranged in promiscuous order, to a carrier in or on which the casings are arranged all in the same order and in the same position with respect to a given plane.

Another object of the invention is the provision of a carrier for the casings having spaced gripping means each for gripping a single casing, and casing delivering means so arranged as to deliver casings to the successive gripping means in the same order, that is to say, with the same ends of the casings directed in the same direction and with the ends of the casings lying in the same plane.

Another object of the invention is the provision of a hopper adapted to contain a collection of promiscuously arranged fuse casings and means to deliver the fuse casings lengthwise of their axes from the hopper.

Another object of the invention is the provision of an improved form of delivery chute which receives the endwise directed casings and is so arranged that the casings are caused to be repositioned where necessary so that the similar ends of all casings are directed in the same direction.

A further object of the invention is generally to improve the construction of fuse casing feeding means.

Fig. 1 is a plan view of the fuse delivering and conveying mechanism embodying the present invention.

Fig. 2 is a sectional elevation of the mechanism of Fig. 1.

Fig. 3 is a perspective detail of the delivery chute and conveyor mechanism.

Fig. 4 is an enlarged sectional detail taken through the length of the delivery chute.

Fig. 5 is a sectional detail taken along line 5—5 of Fig. 4.

Fig. 6 is a perspective detail of the hopper and the feeding blade thereof.

Fig. 7 is a perspective detail of the feeding blade and illustrating the manner in which crosswise positioned casings are removed from the blade.

Fig. 8 is a detailed side view of the adjustable mechanism for effecting the positioning of fuse casings of different lengths to the same height above the conveyor jaws.

Fig. 9 is a longitudinal sectional view of the completed fuse.

Fig. 10 is a side view of the casing operated on by the mechanism of the present invention.

The casing operated upon by the mechanism of the present invention forms a part of the fuse illustrated in Fig. 9. Said fuse is of the cartridge type and comprises a tubular enclosing casing 16 of suitable insulating material, as fibre, having metal end caps 18 crimped or otherwise secured on the ends of the fibre casing. The end caps are provided with depressions 20 in the end walls and receive the bent over ends 22 of a fuse link 24 which is extended through the casing and the ends of which are soldered to the end caps. The casing is filled with or contains a granular or powdery mass 26 of arc quenching material.

Fig. 10 illustrates the casing operated upon by the mechanism of the present invention. The casing 16 is provided with one end cap 18 only. A plurality of such casings are contained in promiscuous order in an open top hopper 28 having downwardly inclined and approaching side walls. The casings are adapted to be removed from the hopper and delivered to a carrier.

Said carrier, as illustrated in Figs. 1, 2 and 3, comprises a horizontally rotatable plate 30 although the carrier may be otherwise arranged. The carrier plate is provided with a plurality of casing grippers 32. Each gripper comprises a stationary jaw 34 and cooperating therewith a pivoted jaw 36. Said jaws outstand beyond the outer periphery of the plate and also above said plate and each set of jaws is adapted to receive a single fuse casing therebetween. The movable jaw 36 is provided with a rearwardly extended gripper opening and closing tail 40. The jaws of each set are constantly urged toward each other or into gripping engagement with the fuse casing therebetween by a compression spring 42 acting upon said tail in a clockwise manner, Fig. 1.

Opening and closing of the grippers is accomplished by a stationary cam 44 over which the ends of the tails 40 ride. The cam is so arranged and positioned as to open the jaws prior to the arrival of the grippers in delivery position and to release said jaws so that they close upon a fuse casing deposited between them. The carrier 30 is advanced or rotated in an intermittent manner by steps of equal length so that the successive grippers are successively positioned into the same delivery position. The carrier is maintained stationary between successive advance movements for a period of time sufficient to permit the delivery of a properly position fuse casing between the open jaws of the successive grippers.

The hopper is provided with a vertical feed blade 46 which is reciprocable upwardly from the bottom of the hopper and downwardly and hence through the collection of promiscuously disposed casings in the hopper to collect on its upper edge thereof casings that are disposed parallel with the width of the blade. The blade is secured to the outer end of a reciprocating lever 48 which is pivoted on a shaft 50 and on the other side of the pivot has a cam roller 52 coacting with a cam 54 fixed to a continuously rotating shaft 56 operated in timed relation to the movement of the carrier 30. Said cam is so arranged that the blade is caused to dwell in its uppermost position for a sufficient period of time to permit the casings located on the upper edge of the blade to slide thereoff and into a delivery chute.

The blade 46 has arcuate outer and inner edges conformed to the arcuate paths of movement thereof. The upper edge of the blade is provided longitudinally thereof with a channel 58, see especially Fig. 7, which channel is generally semi-circular in cross-section and hence open at the top and is of a width sufficient to receive and retain the fuse casings with their end caps thereon. The channel extends the width of the blade and in part is formed by metal side plates 60. The blade at its inner edge is provided with an upstanding projection 62 which reciprocates in a slot 64 formed in the inner wall 66 of the hopper. Said projection at the bottom thereof has a cylindrical passage 68 therethrough which is aligned with said channel 58 and through which passage 68 casings that are in the channel slide toward the delivery chute.

The blade 46 in its vertical movements through the collection of promiscuously arranged casings in the hopper frequently engages casings that are axially aligned with the channel 58 and hence collects them in the channel. It may be that a casing is not picked up by the blade at each stroke thereof but it has been found by experience that the blade picks up casings sufficiently frequently to maintain always a supply of casings waiting for delivery to the carrier.

The casings entrained in the channel of the blade slide along the passage 68 as the blade is elevated and the channel becomes more inclined. The endmost casing abuts against a stationary retaining plate 70 which confronts the inner face of the blade and the projection 62 thereof and serves to retain the casings against endwise movement on the blade as the blade is moved upwardly into position to deliver the casings into the chute.

It sometimes happens that a casing becomes positioned crosswise of the blade on top of the channel 58 and in front of the passage 68, as illustrated in Fig. 7, and if not removed would block the entrance to the passage and prevent the delivery of properly positioned casings. To prevent this action the front wall 66 of the hopper is provided with an inwardly directed stiff bristled brush 72 which is located close to one face of the blade and projects beyond the entrance to the channel. A casing which lies crosswise of the blade is necessarily moved into engagement with the brush as the blade is moved upwardly and hence is caused to be brushed or knocked off the blade. The top edges of the channel 58 are cut away in front of the entrance to the channel, as indicated at 74, for the purpose of hindering the lodgment of a cross-wise positioned casing at this point and also for facilitating the removal of such a casing by the brush.

In the uppermost position of the blade 46 the passage 68 thereof is aligned with a delivery chute 76 which is inclined downwardly to the grippers of the carrier at a sufficiently steep angle to insure the positive sliding of the casings down the chute. The chute, see especially Fig. 4, is essentially rectangular in internal cross-section and has a bottom wall 78 and side walls 80 which define an internal guide passage for the descending casings. The passage is closed at the top by a cover plate 82, the lower end of which is secured to an L-shaped bracket 84 fixed to a side wall of the chute at the lower or delivery end thereof. The upper or entrance end of the chute is secured to the upper end of the guide plate 70. The cover is preferably provided with a leaf spring 86 that projects forwardly of the entrance to the chute. The feed blade 46 also is preferably provided with a spring member 88 which is in front of the exit of the casing passage 68. Ordinarily said spring members do not engage the casings but serve to retain the casings in the passage and in the chute in case the chute is filled with casings and the engagement of the uppermost casing in the chute with the lowermost casing in the passage due to the reciprocation of the feed blade should tend to dislodge the casings.

The casings lie in the chute with their axes parallel to the axis of the chute and some with the cap ends foremost and others with the open ends foremost. The casings are required to be presented to the grippers of the carrier in vertical position and with the cap ends uppermost. For the purpose of properly rearranging the casings the lower portion of the bottom wall 78 of the chute is provided with a longitudinally extended groove 90 the width of which is somewhat greater than the diameter of the tubular bodies of the casings so that the bodies can pass freely but narrower than the diameter of the end caps so that the end caps cannot pass through the slot. If a casing advances down the chute with its open end foremost the tubular body of the casing falls through the slot and the casing assumes a vertical position being supported on the end cap as shown by the dotted position of the casing, Fig. 4, and moves in this position to the end of the chute. If a casing advances down the chute with the end cap foremost, as soon as the casing is sufficiently down the tube for the open end of the casing to clear the upper end of the slot the casing then falls through the slot and assumes a vertical position and the casing advances down the chute with the cap end thereof uppermost. Thus all the casings are presented to the grippers in vertical position and with the cap end thereof uppermost notwithstanding their initial disposition in the chute.

Means are provided positively to assure the movement of the casings through the slot of the chute and the positioning thereof in the proper order. Said means includes a push rod 92 which is reciprocable into and out of the chute over the slot 90 and into engagement with a casing therein to cause the body portion thereof to pass through the slot and the casing to swing into vertical position. Said push rod 92 is secured to the upper end of a vertically reciprocable actuating rod 93, see especially Figs. 2 and 3, suitably guided for vertical movement. The lower end of said rod, see Fig. 2, is pivotally connected to a connecting rod 94 which passes loosely through one end of an operating lever 96 pivoted on the aforesaid shaft 50. The other end of said lever has a cam roll 98 thereon which is engaged and reciprocated by a cam 100 fixed to and rotatable with the shaft 56. A helical compression spring 102 surrounds said connecting rod 94 beneath the lever 96 and at its lower end bears against said rod and at its upper end bears against said lever. A collar 104 is fixed to said connecting rod above and is engaged by said lever. A spring 106 is fixed at its lower end to said collar and at its upper end to a convenient frame part of the mechanism and serves to maintain the push rod yieldingly in elevated position and the lever 96 in engagement with its operating cam 100. The spring 102 is substantially stiffer than the spring 106. The arrangement is such that under ordinary circumstances, or when the push rod 92 is offered no substantial opposition to its reciprocating movements, which means that the casings engaged therewith turn freely and pass through the slot 90 of the chute, the spring 102 does not yield and the connecting rod and arm 96 move as a unit. When, however, the push rod 92 experiences an undue amount of resistance to its downward movement the spring 102 yields and thereby prevents damage to the parts and the casings engaged by the rod.

The foremost one of the vertically disposed casings in the chute is held releasably from escape from the chute by a swinging gate member 108. Said gate member is carried by an arm 110 vertically pivoted at 112 and is spring urged in a direction to maintain its position yieldingly in front of the exit of the chute and against the foremost casing. The gate member, however, is adapted to yield its position when a casing is positively advanced out of the chute to permit the passage of the casing and to swing behind the discharged casing into holding position with the next succeeding casing.

The mechanism for advancing the successive casings out of the chute includes a vertical discharge arm 114, see Figs. 2 and 4. Said arm is located below the chute and is pivoted at its lower end upon a pin 116. A retractile spring 118 serves to maintain the arm yieldingly in an inoperative position and the arm has a tail 120 which engages a fixed pin 122 to define the unoperated position thereof. The arm is adapted to reciprocate into and out of the slot 90 of the chute and to engage at its forward end the vertically disposed casings in the chute. Reciprocation of the discharge arm is accomplished through the reciprocation of the lever 48 that actuates the feed blade 46. The arm 114 has a lever 124 pivoted thereon at 126. The upper end of the lever is connected to the arm through a relatively stiff retractile spring 128, said spring being stiffer than the spring 118. The lower end of said lever is provided with a roller 130 which is adapted to be engaged by a striker plate 132 or other part of said lever 48, thereby to advance the discharge arm in a forward or counter-clockwise direction against the tension of the spring 118 during the upper part of the movement of the lever 124.

The vertically positioned casings in the chute are adapted to be moved outwardly by the discharge arm and against a stationary stop or positioning member 134 disposed above the carrier 30 and the grippers thereof and positioned to cause the casings to be located properly between the jaws of the gripper. Since there may be more vertical casings at one time than at another time in front of the discharge arm and since the movement of the arm is sufficient to advance a single casing from the chute into the confronting gripper if this casing should be the only one that is vertically arranged in the chute at the time of operation of the arm the spring 128 is adapted to yield when the movement of the arm is stopped by the casing or casings between it and the positioning member 134 so as to permit the normal movements of the lever 48.

The successive fuse casings are discharged from the chute into position between the open jaws of the successive confronting grippers against the aforesaid positioning member 134 and upon a shelf 136. Since the fuse casings of any one type of fuse are all the same length and since but one type of fuse casing is intended to be fed at any one time by the feeding mechanism of the present invention it follows that the tops of all the casings stand the same height above the grippers or are all in the same plane. The positioning member 134 is adjustable toward and away from the delivery end of the chute by means of the slot 138 through which the attaching bolt 140 for the member passes or by equivalent means so that the position of the casing between the jaws of the gripper can be properly defined not only for casings of the same diameter but for casings of different diameters which may be run through the mechanism at different times. The shelf 136 is also vertically adjustable to properly position the tops of the casings above the grippers. To this end the shelf is supported by a vertically disposed stationary frame supported plate 142 to which the shelf is connected by one or more bolts 144. The supporting plate 142 has a plurality of bolt receiving passages 146 suitably distributed at different heights to support the shelf in any one of several positions corresponding to the several lengths of different types of fusible casings. Fig. 8 illustrates a different position of the shelf 136 for supporting a fuse casing of a longer type. The chute 76 can also be provided with exchangeable liner plates 148 of different thicknesses, see Fig. 5, to adjust the width of the fuse passage in the chute to the diameter of the particular fuse casing being fed at the time.

The casings are disposed between the open jaws of the grippers at the time the carrier for the grippers is stationary. The carrier then advances and the fuse casing slides along the shelf 136 for a short distance or until the tail 40 of the movable jaw of the gripper passes from engagement with the stationary cam 44 the length of the positioning member 134 in the direction of movement of the grippers and also the shelf 136 is sufficient to maintain the casing in position between the jaws until the gripper closes upon it. A guide member 150 is also positioned at one side of the chute and in confronting relation with the positioning member 134 to form a guide passage therewith along which the casing moves until the time the gripper closes upon it so as to prevent the casing from moving outwardly from its proper position between the open gripper jaws.

I claim:

1. Feeding mechanism for electric fuse casings comprising an intermittently advanceable carrier having a plurality of spaced casing retaining devices, a casing holding hopper, a chute conducting casings from said hopper into position for engagement with said retaining devices, a fixed abutment disposed in front of said chute in position to determine the location of a casing in a retaining device, and a yieldable pusher for delivering individual casings into said devices and against said abutment.

2. Feeding mechanism for electric fuse casings comprising a carrier having a plurality of spaced casing receiving devices, said carrier and devices being intermittently advanceable into and out of a casing delivery position, a receptacle for fuse casings, means to transfer casings from said receptacle and to position individual casings for delivering to the successive devices, a pusher engageable with the successive casings and operative to move them into the engagement of said successive devices, an abutment against which said successive casings are moved by said pusher and which defines the position of said casings in said devices, operating means for said pusher, and a yielding connection between said pusher and operating means.

3. Feeding mechanism for electric fuse casings comprising an intermittently advanceable carrier having a plurality of successively positioned grippers including casing engaging jaws, means for advancing said carrier to move said successive grippers into and out of a delivery position, means for advancing successive fuse casings to said delivery position and into said grippers, and stationary cam means acting upon said successive grippers as they advance into said delivery position to open said jaws to receive a casing between them and subsequently to close said jaws upon said casing.

4. Feeding mechanism for electric fuse casings comprising an intermittently advanceable carrier having a plurality of successively positioned grippers including casing engaging jaws, means for advancing said carrier to move said successive grippers into and out of a delivery position, means for advancing successive fuse casings to said delivery position and into said grippers, cam means acting upon said successive grippers as they advance into said delivery position to open said jaws to receive a casing between them and subsequently to close said jaws upon said casing, said cam means being stationary and similar jaws of said grippers having tails riding over said stationary cam, and spring means acting upon said jaws in a direction to close them.

5. Feeding mechanism for electric fuse casings comprising an intermittently advanceable carrier having a plurality of successively positioned casing grippers thereon, said grippers each comprising a stationary gripping jaw and a pivoted gripping jaw, spring means urging said jaw together, said pivoted jaws having tails, stationarily supported cam means disposed in position to engage said tails and open said jaws during the advance of said carrier into a casing delivery position and to release said tails and permit said spring means to close said jaws during the advance of said carrier out of delivery position, and means for advancing a plurality of fuse casings into said delivery position and successive casings between jaws of successive grippers.

6. Feeding mechanism for electric fuse casings comprising an intermittently advanceable carrier having successive casing engaging devices, means for advancing successive casings towards and for positioning said casings into said devices with their similar ends extended in the same direction, and means operative on the casings for positioning the similar ends in the same plane when they are in said devices.

7. Feeding mechanism for electric fuse casings comprising an intermittently advanceable carrier having successive pairs of casing engaging jaws, means for advancing successive casings into position between said jaws, and positioning means engageable with the casings when they are between and the same height above successive pairs of jaws for locating said successive casings in the same relative position between said successive pairs of jaws.

8. Feeding mechanism for electric fuse casings comprising an intermittently advanceable carrier having successive pairs of casing engaging jaws, means for advancing successive casings into a delivery position and into said successive pairs of jaws, an abutment member located in front of said delivery position and in position to be engaged by each casing as it is moved into said successive pairs of jaws to locate all of the fuse casings in the same relative position between said pairs of jaws, means located under the jaws and casings and engageable with the casings for positioning the ends thereof the same distance from said jaws, and means for opening said jaws to receive said casings and to thereafter close said jaws upon said casings.

9. Feeding mechanism for electric fuse casings comprising an intermittently advanceable carrier having thereon successively positioned casing engaging devices, a delivery shelf over which said successive devices are advanceable, and means for advancing successive casings onto said shelf and into position in said devices.

10. Feeding mechanism for electric fuse casings comprising an intermittently advanceable carrier having thereon successively positioned casing engaging devices, a delivery shelf over which said successive devices are advanceable, means for advancing successive casings onto said shelf and into position in said devices, and a positioning member disposed in the path of advancing casings into said devices and into position to be engaged by the successive advancing casings to define the position thereof in said devices.

11. Feeding mechanism for electric fuse casings comprising an intermittently advanceable carrier having a plurality of successively positioned pairs of fuse gripping jaws, a delivery shelf over which said jaws are advanceable, a positioning member disposed behind the ends of said jaws, and means for advancing successive casings into said shelf and between the jaws of the successive pairs of jaws and against said positioning member.

12. Feeding mechanism for electric fuse casings comprising an intermittently advanceable carrier having a plurality of successively positioned pairs of fuse gripping jaws, a delivery shelf over which said jaws are advanceable, a positioning member disposed behind the ends of said jaws, means for advancing successive casings onto said shelf and between the jaws of the successive pairs of jaws and against said positioning member, and means acting on said jaws and operable to open them prior to the delivery of a casing therebetween and to close them upon the casing prior to their movement beyond said shelf.

13. Feeding mechanism for electric fuse casings comprising a carrier having a plurality of pairs of casing engaging jaws, said carrier being intermittently advanceable to move said pairs of jaws into and out of a casing delivery position, a casing supporting shelf disposed under said jaws and extended in the direction of advance thereof, means for delivering successive casings onto said shelf and into said open pairs of jaws, cam means responsive to the movement of said pairs of jaws for opening said jaws to receive said casings and to close said jaws upon said casings before said casings are moved off said shelf.

14. Feeding mechanism for electric fuse casings having end caps thereon comprising a horizontally disposed delivery shelf, means for delivering successive fuse casings in vertical position on said shelf with the cap end of said casings uppermost, a carrier having pairs of casing engaging jaws thereon movable over said shelf, said carrier being intermittently advanceable to move said jaws into and out of said casing delivery position, and means operable by movement of said carrier for opening said jaws to receive a casing therebetween and for closing said jaws upon the casing prior to the movement of the casing away from said shelf.

15. Feeding mechanism for electric fuse casings each having an end cap on the end thereof, means providing right angularly positioned casing supporting surfaces, means for delivering successive casings upon said surfaces with their cap ends engaged with one of said surfaces and their cap free ends engaged with the other of said surfaces, a carrier having casing engaging jaws movable between and lengthwise of said surfaces, said carrier being intermittently advanceable, and means operable by movement of said carrier for opening said jaws to receive a casing therebetween and for closing said jaws upon the casing prior to movement of said jaws and casing away from said supporting surfaces.

16. Feeding mechanism for electric fuse casings comprising an intermittently horizontally advanceable carrier having a plurality of fuse holding devices, a casing holding hopper, an inclined chute leading from said hopper to said carrier, means for delivering casings from said hopper endwise into said chute, and means associated with said chute for re-arranging said casings and for presenting said casings sidewise and vertical to said devices.

17. Feeding means for electric fuse casings each having an end cap on an end thereof, a casing carrier having a plurality of casing holding devices, a hopper for said casings, a chute inclined downwardly from said hopper to said carrier, means for delivering casings either end foremost from said hopper into said chute, means associated with said chute for re-arranging said casings into vertical position and with the cap ends thereof uppermost, and means for delivering such re-arranged casings into successive holding devices.

18. Feeding mechanism for electric fuse casings each having an end cap on an end thereof, said mechanism comprising an intermittently advanceable carrier having casing holding devices, a hopper for said casings, a chute extending downwardly from said hopper to said carrier, means for delivering casings with either end foremost into said chute from said hopper, said chute having a bottom wall down which said casings are slidable and said bottom wall having a slot therethrough which is longer than said casings and wider than the diameter thereof but narrower than the diameter of said end caps, said chute having side walls which position said casings to pass over said slot and to fall therethrough and to hang suspended vertically in said slot by end caps, and means operative upon successive suspended casings for advancing them into successive devices of said carrier.

19. Feeding mechanism for electric fuse casings each having an end cap on an end thereof, said mechanism comprising an intermittently advanceable carrier having casing holding devices, a hopper for said casings, a chute extending downwardly from said hopper to said carrier, means for delivering casings with either end foremost into said chute from said hopper, said chute having a bottom wall down which said casings are slidable and said bottom wall having a slot therethrough which is longer than said casings and wider than the diameter thereof but narrower than the diameter of said end caps, said chute having side walls which position said casings to pass over said slot and fall therethrough and to hang suspended vertically in said slot by said end caps, means for advancing successive suspended casings into successive devices of said carrier, and power actuated means for positively moving said casings through said slot.

20. Feeding mechanism for electric fuse casings each having an end cap on an end thereof, said mechanism comprising an intermittently advanceable carrier having casing holding devices, a hopper for said casings, a chute extending downwardly from said hopper to said carrier, means for delivering casings with either end foremost into said chute from said hopper, said chute having a bottom wall down which said casings are slidable and said bottom wall having a slot therethrough which is longer than said casings and wider than the diameter thereof but narrower than the diameter of said end caps, said chute having side walls which position said casings to pass over said slot and fall therethrough and to hang suspended vertically in said slot by said end caps, means for advancing successive suspended casings into successive devices of said carrier, power actuated means for positively moving said casings through said slot comprising a member reciprocable over said slot into and out of engagement with the casings in said chute, and power means for reciprocating said member.

21. Feeding mechanism for electric fuse casings each having an end cap on an end thereof, said mechanism comprising an intermittently advanceable carrier having casing holding devices, a hopper for said casings, a chute extending downwardly from said hopper to said carrier, means for delivering casings with either end foremost into said chute from said hopper, said chute having a bottom wall down which said casings are slidable and said bottom wall having a slot therethrough which is longer than said casings and wider than the diameter thereof but narrower than the diameter of said end caps, said chute having side walls which position said casings to pass over said slot and fall therethrough and to hang suspended vertically in said slot by said end caps, means for advancing successive suspended casings into successive devices of said carrier, power actuated means for positively moving said casings through said slot, comprising a member reciprocable over said slot into and out of engagement with the casings in said chute, and power means for reciprocating said member, and a yieldable connection between said power means and said reciprocable member adapted to yield upon the application of a predetermined pressure thereupon to permit continued operation of said power means independently of corresponding movement of said reciprocating member.

22. Feeding mechanism for electric fuse casings each having an end cap on one end thereof, said mechanism comprising an intermittently advanceable carrier having a plurality of fuse engaging devices, a hopper for said casings, a chute inclined downwardly from said hopper to said carrier, means for delivering casings either end foremost from said hopper into said chute, means associated with said hopper for re-arranging said casings to dispose them vertically with the cap ends thereof uppermost, advancing means operable upon the vertically positioned casings to advance the foremost one out of said chute and into a fuse engaging device aligned therewith, an abutment member disposed in the path of advance of the foremost casing to limit the advance thereof beyond said chute, and a spring urged trap member disposed in yielding engagement with the successive foremost casings to retain them releasably in said chute.

23. Feeding mechanism for electric fuse casings comprising an intermittently advanceable carrier having a plurality of casing holding devices, a hopper for said casings, a chute inclined downwardly from said hopper to said carrier, means for delivering casings endwise to said chute from said hopper, means associated with said chute for re-arranging said casings in a vertical position in the lower end of said chute, and advancing means for advancing successive foremost casings from said chute into successive devices comprising a reciprocating member movable into and out of engagement with the vertically positioned casings, power means for reciprocating said member, and a yielding connection between said member and power means operative to yield upon a predetermined resistance to movement of said member while permitting the continued movement of said power means.

24. Feeding mechanism for electric fuse casings each having an end cap on one end thereof, said mechanism comprising a carrier having a plurality of casing holding devices, and means for positioning successive casings into said devices comprising a chute inclined downwardly to said carrier and down which casings are adapted to slide endwise, means associated with said chute to re-arrange said casings into a vertical position with the cap ends thereof uppermost in the lower part of said chute, and a reciprocating pusher member movable into and out of engagement with the vertically positioned casings to move successive casings out of said chute into said holding devices.

25. Feeding mechanism for electric fuse casings comprising a carrier having a plurality of casing holding devices, a hopper for said casings, a chute inclined downwardly from said hopper to said carrier, and means for delivering casings endwise into said chute from said hopper comprising a blade reciprocable vertically through the casings in said hopper in line with said chute, said blade having a longitudinally grooved upper edge in which fuse casings are adapted to be lodged, the groove being deep enough to hold a casing longitudinally disposed therein and shallow enough to prevent casings lodging crosswise therein, the upper portion of said upper edge of said blade being in line with said chute and being inclined downwardly toward said chute sufficiently to cause said casings thereon to slide therefrom endwise into said chute.

26. Feeding mechanism for electric fuse casings comprising a carrier having a plurality of casing holding devices, a hopper for said casings, a chute inclined downwardly from said hopper to said carrier, means for delivering casings endwise into said chute from said hopper comprising a blade reciprocable vertically through the casings in said hopper in line with said chute, said blade having a longitudinally grooved upper edge in which fuse casings are adapted to be lodged, the groove being deep enough to hold a casing longitudinally disposed therein and shallow enough to prevent casing lodging crosswise therein, the upper portion of said upper edge of said blade being in line with said chute and being inclined downwardly toward said chute sufficiently to cause said casings thereon to slide therefrom endwise into said chute, and means for reciprocating said blade and for holding said blade momentarily stationary in the elevated position thereof.

27. Feeding mechanism for electric fuse casings comprising a carrier having a plurality of casing holding devices, means for delivering successive casings into said devices including a chute inclined downwardly to said carrier, a hopper for said casings, and means for delivering casings from said hopper into said chute comprising a vertical blade reciprocable vertically through the collection of casings in said hopper, said blade having an upper edge provided with a longitudinal casing holding channel therein and a projection which extends upwardly above said channel and lies in a slot in said hopper between said hopper and said chute and has a casing passage therethrough aligned with said channel, said blade in its uppermost position having its channel aligned with and inclined downwardly toward said chute to cause casings in said channel to slide into said chute, and means to remove from the top of the said blade casings that may be positioned cross-wise thereof.

28. Feeding mechanism for electric fuse casings comprising a carrier having a plurality of fuse holding devices, and means for delivering successive casings into successive devices including a chute inclined downwardly to said carrier, a hopper in which fuse casings are promiscuously arranged, and means for removing casings from said hopper and for delivering said casings endwise into said chute.

29. Feeding mechanism for electric fuse casings comprising a carrier having a plurality of fuse holding devices, means for delivering successive casings into successive devices including a chute inclined downwardly to said carrier, a hopper in which fuse casings are promiscuously arranged, means for removing casings from said hopper and for delivering said casings endwise into said chute comprising a member reciprocable through the casings in said hopper and having a channel therein in which the casings are adapted to lie longitudinally thereof, said member being movable into line with said chute to permit the casings to pass endwise from said channel in said chute, and means for removing from said member any casings that may be disposed thereon crosswise of said channel.

ELMER H. TAYLOR.